United States Patent [19]

Saji et al.

[11] Patent Number: 4,999,649

[45] Date of Patent: Mar. 12, 1991

[54] IMPROVED SHEET CONVEYING DEVICE FOR RECORDING APPARATUS

[75] Inventors: Yoshito Saji, Ashiya; Yoshiteru Namoto; Yoshihiro Mushika, both of Hirakata; Haruo Yamashita, Osaka, all of Japan

[73] Assignee: Matsushita Electric Industrial Co., Ltd., Osaka, Japan

[21] Appl. No.: 432,868

[22] Filed: Nov. 7, 1989

[30] Foreign Application Priority Data

Nov. 11, 1988 [JP] Japan ................................ 63-286156

[51] Int. Cl.$^5$ ...................... G01D 15/24; G01D 15/10; B41J 13/08

[52] U.S. Cl. .................................... 346/134; 346/138; 346/76 PH; 400/635; 400/617; 400/120

[58] Field of Search .................. 346/76 PH, 134, 138; 400/120, 635, 617

[56] References Cited

U.S. PATENT DOCUMENTS 4,388,628 6/1983 Moriguchi et al. .
4,710,783 12/1987 Caine et al. .
4,829,320 5/1989 Une et al. ........................ 346/76 PH

FOREIGN PATENT DOCUMENTS 59-159370 9/1984 Japan .
59-164164 9/1984 Japan .

*Primary Examiner*—Bruce A. Reynolds
*Assistant Examiner*—Huan Tran
*Attorney, Agent, or Firm*—Stevens, Davis, Miller & Mosher

[57] ABSTRACT

The device includes a record paper conveying device which rotates around a record paper carrier body to convey a paper sheet around the carrier body by gripping the leading edge of the paper sheet. In this arrangement, the carrier body, against which a recording head abuts during a recording operation, is rotated following the movement of the paper sheet by a friction force between the platen part and the recording paper sheet. In one embodiment, the carrier body is stationary, and accordingly, the conveying speed of the record paper sheet is determined only by the drive speed of the conveying device so that the record paper sheet can be precisely conveyed.

9 Claims, 4 Drawing Sheets

SHEET CONVEYING DEVICE FOR RECORDING APPARATUS

BACKGROUND OF THE INVENTION

The present invention relates to a recording apparatus for producing hard copies for video systems, computers or the like.

Recently, there has developed a strong desire to produce a hard copy having high quality of a coloured picture in a shorter time, and in order to satisfy this desire, apparatus primarily of a thermal printing type are now being put in practical use. For recording a coloured picture by means of thermal printing, there is adopted a three colour sequential printing system in general, in which an ink sheet has three sections of three colours corresponding to three color images of the picture, and three printing operation each corresponding to each of three colours are carried out on a single picture section of a recording paper sheet. In this system, it is required to return the recording paper sheet three times to the same position relative to a thermal head of a recording device. In the conventional recording apparatus of the above-mentioned type, the recording paper sheet conveying systems are roughly grouped into two types.

A recording apparatus according to a first type conveying system of a prior art is shown in FIG. 1. A drum 104 having an elastic surface 104*a* is rotated in a direction indicated with an arrow 1*a*, while the leading edge 101*a* of a recording paper sheet 101 is gripped by a gripping device 104*b* and the recording paper sheet is wound around the drum 104. During the first revolution of the drum 104, an image of the first colour is recorded in a manner such that heat generating elements 103*a* of a thermal head 103, which makes pressure-contact with the drum 104 with an ink sheet 102 and a recording paper sheet 101 interposed therebetween, are selectively energized for thermal printing. In a similar way, images of the second colour and third colour are sequentially recorded on the same section of the recording paper sheet during the succeeding two revolutions of the drum 104 for completing a full-colour recording of one picture.

As mentioned above, in the first prior art type conveying system, the return of the recording paper sheet to its original position is made by rotating the drum 104 successively by three revolutions in one direction. As a result, there is obtained an advantage that no reciprocal return time of the recording paper sheet may be eliminated, resulting in a shorter recording time.

Next, a recording apparatus according to a second prior art type conveying system is shown in FIG. 2. A recording paper sheet 201 is reciprocally conveyed by means of a driving capstan roller 205 rotatable in both rotating directions and a pinch roller 206 in pressure contact with the capstan roller with the recording paper sheet holded therebetween. As conveying the recording paper sheet 201 in a direction indicated with an arrow 2*a* and pressing a thermal head 203 onto a platen roller 204 having an elastic surface 204*a* with an ink sheet 202 and the recording paper sheet 201 interposed therebetween, heat generating elements 203*a* are selectively energized or controlled in its heat amount, thereby producing a picture having a first colour of the ink sheet 202. Next, the thermal head 203 is separated from the platen roller 204 and the capstan roller 205 is rotated in the reverse direction, returning the recording paper sheet 201 in a direction indicated with an arrow 2*b* to the same position as before recording. Then, the thermal head 203 is again pressed against the platen roller 204, and as conveying the recording paper sheet 201 in a direction indicated with an arrow 2*a*, an image of a second colour is recorded on the recording paper sheet which has been already recorded with the image of the first colour. In a similar way, an image of a third colour is recorded on the recording paper sheet already recorded with the first and second colours, thereby completing a recording of a full-coloured picture.

As mentioned above, since, in the second prior art type conveying system, the recording paper sheet 201 is conveying by means of the rigid capstan roller 205, the convey speed of the recording paper sheet 201 is relatively stable. As a result, a fine picture having decreased slippage among three colours can be obtained.

However, the recording apparatus of the prior art include the following problems.

In the above-mentioned first prior art type conveying system, the peripheral speed v' of the drum 104 measured at the pressure contact portion of the thermal head 103 is greater than the speed v measured at the non-contact portion of the drum including the portion occupied by the gripping device 104. Accordingly, the conveying speed of the recording paper sheet is dependent upon the peripheral speed v' at the pressure contact portion. However, the peripheral speed v' at the pressure contact portion is unstable, and varies considerably depending upon the elasticity of the elastic body 104*a* or the contact pressure of the thermal head 103. In consequence, the conveying speed of the recording paper sheet can not be maintained at a precisely constant value, thereby causing an irregular density of the recording or positional slippage among the three colour images in recording, resulting in deterioration of picture quality.

Further, in the above-mentioned second prior art type recording system, the recording paper sheet 201 is reciprocally conveyed. Therefore, there are required a rather longer return time of the recording paper sheet and repetitions of contact and separation of thermal head 203, causing a problem of a longer recording time.

SUMMARY OF THE INVENTION

In view of the above-mentioned problems of prior art, the present invention is devised and accordingly, the object of the present invention is to provide a recording apparatus in which a multi-coloured image of a high quality having little slippage among three colours can be recorded in a shorter time, and the size of the apparatus can be easily decreased.

For achieving the above-mentioned object of the invention, a first measure of the present invention is characterized in that a conveying means rotationally conveys a recording paper sheet around a roller-like rotatable carrier body having an elastic surface, gripping a leading edge of the recording paper sheet, while a recording means is maintained in pressure contact with the carrier body with the paper sheet being interposed therebetween. In this arrangement, the carrier body is moved following the running motion of the recording paper sheet due to a friction force between itself and the recording paper sheet at the pressure contact portion, that is, the recording paper sheet is conveyed only by the driving force of the conveying means which grips the leading edge of the recording paper sheet. In consequence, the conveying speed is maintained with a high degree of precision, resulting in an excellent picture having little slippage among colours and a little irregularity in density of recording. Further, since the recording paper sheet is rotationally conveyed around the carrier body with its leading edge being gripped by the conveying means, the return time of the recording paper sheet is shortened, resulting in a shorter recording time.

The second measure of the present invention is characterized in that a conveying means rotationally conveys a recording paper sheet around a roller-like stationary carrier body, the surface of which is composed of a rigid surface and an elastic surface, gripping the leading edge of the recording paper sheet, while a recording means is made in pressure contact with the elastic surface of the carrier body for recording. In this arrangement, the recording paper sheet is conveyed only by the driving force of the conveying device gripping the leading edge of the recording paper sheet, even in such case that the friction between the recording paper sheet and the carrier body becomes greater due to the stationary state of the carrier body. Further, since the most portion of the carrier body is rigid, variations in the length of the running path of the recording paper sheet along the surface of the carrier body is decreased, and accordingly, the recording paper sheet is conveyed with a more precise speed and a more excellent picture can be obtained in comparison with the conveying apparatus in the first measure.

The third measure of the present invention is characterized in that a conveying means rotationally conveys a recording paper sheet around a roller-like stationary and rigid carrier body gripping the leading edge of the recording paper sheet, while a recording means is made in pressure contact with a rotatable elastic roller, which is disposed inside of the carrier body and constitutes a platen part of the outer peripheral surface of the in which the platen part can be rotated, following the recording paper sheet on conveyance due to a friction force between the recording paper sheet and the platen part at the pressure contact position, the recording paper sheet can be fed precisely by the conveying means which grips the leading end of the recording paper sheet irrespective of a deformation of the platen part due to the pressure contact force by the recording head, and the load on the recording paper sheet at the recording position is decreased.

The fourth measure of the present invention is characterized in that a conveying means rotationally conveys a recording paper sheet around a stationary and rigid carrier body of an elliptic shape, gripping the leading edge of the recording paper sheet, while a recording means is made in pressure contact with a rotatable elastic roller, which is disposed inside of the carrier body and constitutes a platen part of the outer surface of the carrier body, for recording. In this arrangement, in which the platen part can be rotated following the recording paper sheet on conveyance due to a friction force between the recording paper sheet and the platen part at the pressure contact part, the recording paper sheet can be fed precisely by the conveying means which grips the leading end of the recording paper sheet, irrespective of a deformation of the platen part due to the pressure contact force by the recording head while the load on the recording paper sheet at the recording position is decreased, resulting in reduction in the driving force of the conveying means, and further, the height of the apparatus can be decreased by virtue of the elliptic shape of the carrying body.

The fifth measure of the present invention is characterized in that a conveying means rotationally conveys a recording paper sheet around a stationary and rigid carrier body of an elliptic shape, gripping the leading edge of the recording paper sheet, while a rotatable elastic roller is made in pressure contact with a recording means, which is disposed in the carrier body and constitutes a part of the outer surface of the carrier body, for recording. In this arrangement, in addition to the advantage that the sheet can be precisely conveyed and a load at the recording portion and a driving force of the conveying means are both decreased, there is obtained another advantage that the size of the apparatus can be decreased as a result of forming the carrier body in an elliptic shape and locating the recording means inside of the carrier body.

DETAILED DESCRIPTION OF THE INVENTION

A first embodiment of the present invention is described below by referring to the attached drawings.

Figure 1:
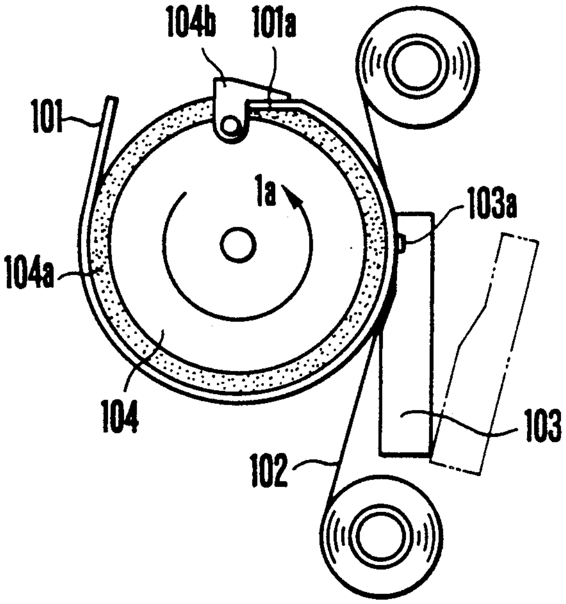
FIG.1 PRIOR ART
FIGS. 1 and 2 are schematic illustrations of recording apparatus of prior art,.
Figure 2:
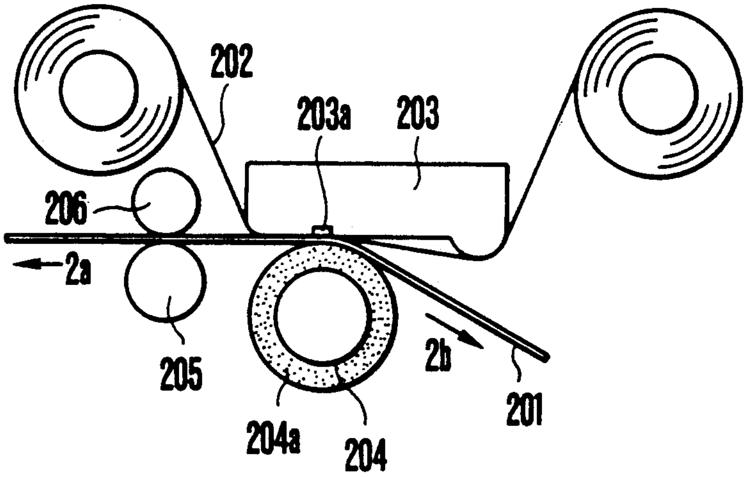
FIG.2 PRIOR ART
Figure 3:
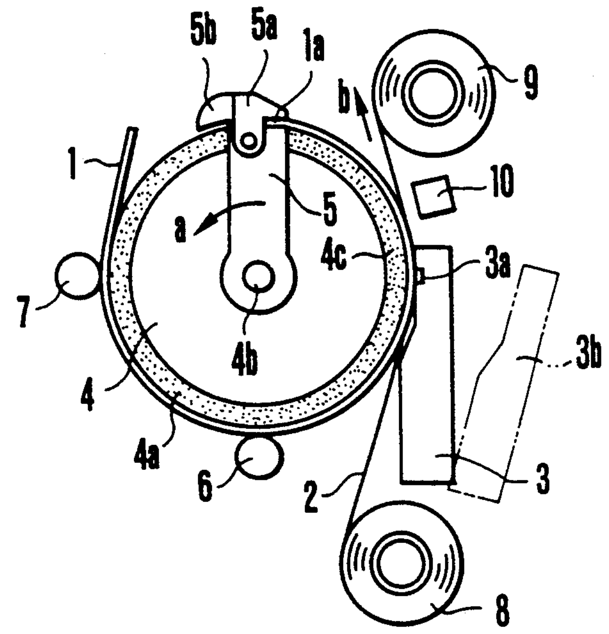
FIG. 3 is a basic illustration of a recording apparatus according to a first embodiment of the present invention.
Figure 4:
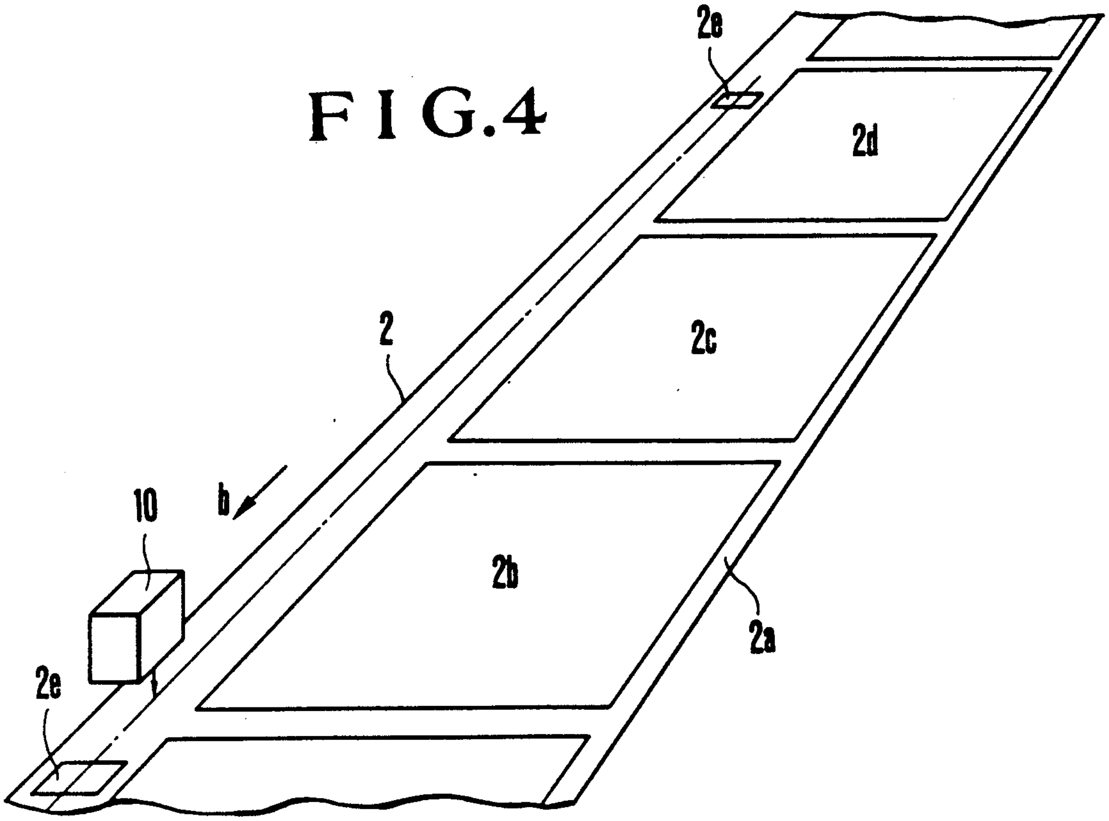
FIG. 4 is a perspective view showing an ink sheet and a sheet sensor.
Figure 5:
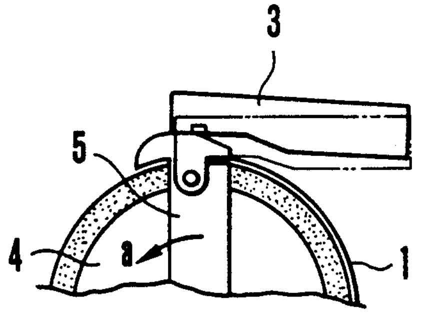
FIG. 5 is a partly sectional fragmentary schematic illustration showing the behavior of a conveying mechanism shown in FIG. 3 at the time when a conveying member passes over the pressure contact portion of a thermal head.

FIG. 3 is a basic illustration of a recording apparatus according to a first embodiment of the present invention, FIG. 4 is an enlarged perspective view showing an ink sheet 2 which is one of the constituent members in FIG. 3, and FIG. 5 is a partly sectional fragmentary schematic illustration showing the behavior of the constituent members shown in FIG. 3. In FIG. 3, there are shown a recording paper sheet 1, an ink sheet 2, a thermal head (recording means) 3 including heat generating elements 3*a* arranged substantially on a straight line, and a roller-like drum (carrier body) 4 which has a surface layer of an elastic body 4*a* made of rubber or the like and is rotatably supported by a shaft 4*b*. Numeral 5 denotes a conveying mechanism which performs a predetermined rotary motion about the shaft 4*b* driven by a driving means not shown with the chuck 5*a* thereof gripping the front edge 1*a* of the recording paper sheet 1 with sufficient force. Further, there are shown rotatable guide rollers 6 and 7 which are in pressure contact with the drum 4, guiding the recording paper sheet 1, a sheet supply reel 8 which is wound thereon with an ink sheet 2, a take-up reel 9 for taking up the used ink sheet, and a sheet sensor 10 for detecting a position of the ink sheet 2.

FIG. 4 shows the ink sheet 2 with respect to its basic structure and its positional relation relative to the sheet sensor 10. A transparent basic material 2*a*, has painted thereon a yellow ink 2*b*, a magenta ink 2*c* and a cyan ink 26 in that order with a predetermined interval, each inked section having an area corresponding to the area of a picture to be recorded. Each three inked sections having different three colours, respectively, are defined as one set, and a mark 2*e* is put for indicating the front of the set. The mark 2*e* is so located in the main scanning direction of the heat generating elements that, when the ink sheet 2 runs in a direction indicated with an arrow (b), the mark 2*e* passes over a position just opposite to the sheet sensor 10.

FIG. 5 shows a positional relation between the tip portion 5*b* of the conveying mechanism 5 and the thermal head 3 at the time when the conveying mechanism 5 passes just over the pressure contact portion 4*c* of the thermal head. The surface of the tip portion 5*b* has the substantially same property as that of the recording paper sheet.

The function of the recording apparatus according to the above-mentioned first embodiment is described below.

In FIG. 3, the conveying mechanism 5 rotates in a direction indicated with an arrow (a) gripping the leading edge 1*a* of the recording paper sheet 1 while the thermal head 3 stands at a position 3*b* separated from the recording paper sheet 1, and passes over the pressure contact position 4*c* (hereinafter, referred to as a head pressure contact portion). The conveying mechanism 5 continues to rotate until the record starting portion of the recording paper sheet 1 reaches a position opposite to the heat generating elements 3*a*. In this state of the recording paper sheet 1, the ink sheet 2 is conveyed in a direction indicated with an arrow (b) by rotating the sheet take-up reel 9 with the use of a driving means (which is not shown) for detecting and positioning the front edge of the first color (yellow) section of the ink sheet 2. At the time the sheet sensor 10 detects the sheet mark 2*e*, the record starting portion of the yellow ink region 2*b* stands at a position just opposite to the heat generating elements 3*a*.

Next, the thermal head is put in pressure contact with the drum 4, and the conveying mechanism 5 is rotated in a direction indicated with the arrow (a) by a driving means not shown such as a pulse motor for conveying the recording paper sheet 1 by a predetermined distance. At the same time, the sheet take-up reel 9 is also rotated for conveying the ink sheet 2 in a direction indicated with the arrow (b) and taking up the same with no slack. While the recording paper sheet 1 and the ink sheet 2 are being conveyed, the heat generating elements 3*a* are selectively energized or controlled in its heat amount for transferring the ink of the ink sheet 2 onto the recording paper sheet 1, thereby completing a recording of the yellow ink over the whole picture area. At this instant, the conveying means 5 has rotated substantially one round around the periphery of the drum 4.

Next, the conveying mechanism 5 further rotates in a direction indicated with the arrow (a), and passes over the head pressure contact portion 4*c* while the tip portion 5*b* pushes the thermal head 3 upwards. At the same time, the ink sheet 2 is continuously conveyed in a direction indicated with the arrow (b). At the instant when the record starting position of the recording paper sheet 1 reaches again the position opposite to the heat generating elements 3*a*, the record starting position of the second colour section, i.e. the magenta section, of the ink sheet 2 stands at a position also opposite to the heat generating elements 3*a*. From this state, the same operation as for the first colour section is repeated, thereby recording a picture of magenta colour over the picture of yellow colour.

In a similar way, a picture of the third colour, i.e. cyan, is recorded, thereby completing a recording of a full-coloured picture.

In the above-mentioned operations, the drum 4 is driven by a frictional force existing between the head pressure contact portion 4*c* and the recording paper sheet 1, following the motion of the recording paper sheet 1. In other words, the recording paper sheet is driven only by the conveying mechanism 5 which rotates with its tip portion gripping the front edge 1*a* of the recording paper sheet 1, but receives no driving force from the drum 4. By virtue of this feature, a stable conveying speed and a reproducible conveying distance can be obtained. In consequence, irregular densities of the recorded picture or positional slippage among three colour images caused by variations in conveying speed or an inferior reproducibility of the conveying distance are decreased, thereby assuring a picture of a high quality. Further, since the recording paper sheet runs around the drum 4 in a rotating manner, the moving distance of the recording paper sheet required for recording can be minimized, and since the recording paper sheet and the drum 4 both rotate in the same direction, the starting position of a next colour section can be detected and positioned without requiring the thermal head 3 to be separated from the drum 4. As a result, there is also obtained in this embodiment the advantage relating to the prior art first type system as mentioned above, that is a separating operation for the thermal head is unnecessary.

In this embodiment, an elastic body 4*a* is provided around the outer periphery of the drum 4. However, in case the winding angle of the recording paper sheet 1 around the drum 4 is great, there is a risk that the recording paper sheet will be moved by a frictional force from the elastic body. To prevent this motion of the recording paper sheet caused by the frictional force, a film of a low friction material such as Teflon may be attached on the surface of the elastic body 4*a*, or the elastic body itself may be made of a low friction material.

A second embodiment of the present invention is described below by referring to the drawings.

Figure 6:
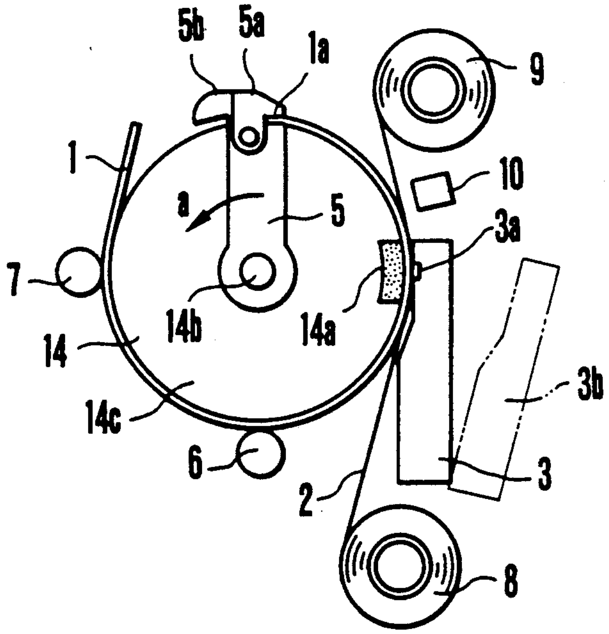
FIG. 6 is a basic illustration of a recording apparatus according to a second embodiment of the present invention.

FIG. 6 shows a basic arrangement of a recording apparatus according to this second embodiment. In FIG. 6, like reference numerals are attached to like elements as those shown in FIG. 3, and descriptions therefor have been omitted for the sake of brevity. The difference from those shown FIG. 3 is that the drum 14 (carrying means) is stationary and secured to a fixed shaft 14*b*. A conveying mechanism 5 is adapted to rotate around the drum 14 in close vicinity to the peripheral surface of the drum with its chucking portion 5*a* gripping the leading edge 1*a* of the recording paper sheet 1. Further, only a part of the drum 14 where a thermal head 3 (recording means) is put in pressure contact with the drum 14 is made of an elastic material 14a, but the other remaining part 14c is made of a rigid material such as hard resin or metal.

The recording function of this second embodiment is similar to that of the first embodiment, except that the drum 14 is not rotatable, but stationary, and accordingly the detailed description is omitted.

As mentioned above, since the drum 14 is stationary, the recording paper sheet 1 is driven only by a driving force of the conveying mechanism 5 gripping the leading edge la of the recording paper sheet 1, and receives no other driving force, for example, from the drum 14, even in case the friction between the recording paper sheet 1 and the drum 14 is increased due to a greater winding angle of the recording paper sheet around the drum 14. Further, since the periphery of the drum 14 is composed of a rigid material, the fluctuation of the running path of the recording paper sheet guided along the surface of the drum 14 is decreased. As a result, the reproducibility of the conveying speed and the conveying distance for the recording paper sheet can be improved, and an excellent picture quality having little irregularity in recording density and little positional slipage among colours can be obtained. Further, the recording time can be also easily shortened for the same reason as in the first embodiment.

In this embodiment, if a film of a low friction material such as Teflon is applied over the peripheral surface of the drum 14, or the rigid portion 14c and the elastic portion 14a themselves are made of a low friction material, the frictional resistance between the recording paper sheet 1 and the drum 14 is decreased, thereby also decreasing the load exerted to the conveying mechanism 5.

A third embodiment of the present invention is described below by referring to the drawings.

Figure 7:
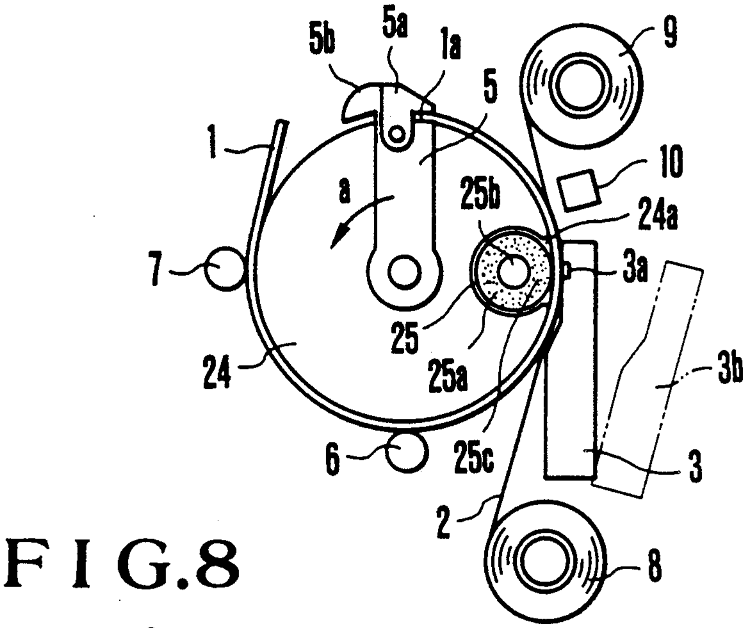
FIG. 7 is a basic illustration of a recording apparatus according to a third embodiment of the present invention.

FIG. 7 is a schematic view showing a basic arrangement of a recording apparatus according to the third embodiment. In FIG. 7 like reference numerals are attached to like elements as those shown in FIG. 6, and accordingly the detailed description is omitted for the sake of brevity. The difference from those shown FIG. 6 is that inside of a stationary rigid drum 24 (conveying mechanism), there is provided a platen roller 25 having a surface layer 25a made of elastic materials such as rubber and being rotatable about a shaft 25b. The platen roller 25 is so arranged that a part thereof constitutes a part of the outer peripheral surface of the drum 24 at an opening portion 24a of the drum 24. A thermal head 3 (recording means) is in pressure contact with the platen roller 25, an ink sheet 2 and a recording paper sheet 1 being interposed therebetween.

The recording function of this third embodiment is similar to that of the second embodiment, except that the drum 14 is not rotatable, but stationary, and therefore the description thereof is omitted.

As mentioned above, in this embodiment, since the recording paper sheet makes contact with the platen roller 25 only at the head pressure contact portion 25c, the platen roller rotates only in dependence upon the motion of the recording paper sheet 1. Therefore, the recording paper sheet 1 is conveyed only by the conveying means 5 which rotates with its tip portion gripping a front edge 1a of the recording paper sheet 1, and receives no driving force from the platen roller 25. As a result, the conveying speed of the recording paper sheet is stabilized, and the reproducibility of the conveying distance of the same is improved, resulting in an excellent picture quality having a little irregularity in density and little slippage among-colours. Further, since the platen roller is rotatable, the load exerted on the conveying mechanism 5 for conveying the recording paper sheet 1 is decreased, and the recording paper sheet is conveyed in a stable manner. Thus, a recording apparatus of smaller size and lower cost can be obtained. In addition, similarly to the first embodiment, the recording time can be easily shortened.

Further, in this embodiment, if a film of a low friction material such as Teflon is applied over the peripheral surface of the drum 24, or the drum 24 itself is made of a low friction material, the frictional resistance between the recording paper sheet 1 and the drum 24 is decreased, thereby also decreasing the load exerted on the conveying mechanism 5.

A fourth embodiment of the present invention is described below by referring to the drawings.

Figure 8:
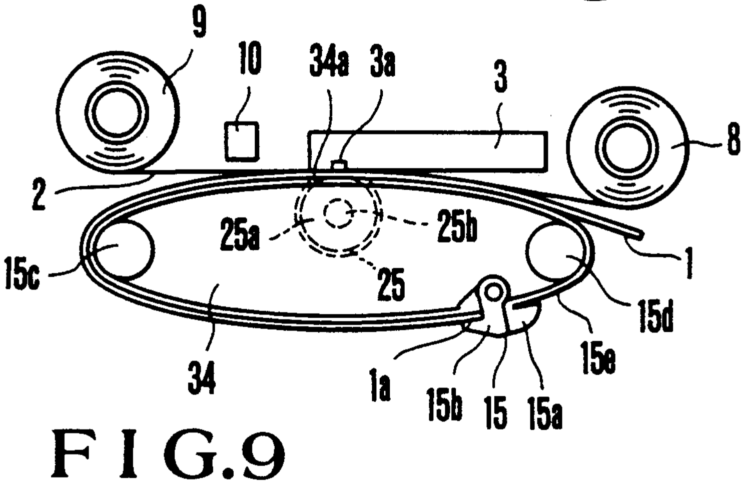
FIG. 8 is a basic illustration of a recording apparatus according to a fourth embodiment of the present invention.

FIG. 8 is a schematic view showing a basic arrangement of a recording apparatus according to the fourth embodiment. In FIG. 8 like reference numerals are attached to like elements as those shown in FIG. 7, and the detailed description is for the sake of brevity omitted. The difference from those shown in FIG. 7 is that a rigid and stationary carrier body 34 has not a roller-like shape, but has an elliptical shape, and a conveying mechanism 15 rotating around the carrier body 34 gripping the leading edge 1a of a recording paper sheet 1 is composed of pulleys 15c, 15d and a belt 15e. A platen roller 25 is so arranged that a part of the surface thereof constitutes a part of the preripheral surface of the carrier body 34 at an opening portion 34a of the carrier body 34 which is located at a position where the radius of curvature of the carrier body surface is maximum. A thermal head 3 (recording means) is in pressure contact with the platen roller 25, an ink sheet 2 and a recording paper sheet 1 being interposed therebetween.

The recording function of this fourth embodiment is similar to that of the third embodiment, except that the conveying mechanism 15 does not move along a circular path, but is rotated around the surface of a carrier body 34 of an elliptical shape by means of pulleys 15c, 15d and a belt 15e, and therefore the description thereof is omitted.

As mentioned above, in this embodiment, an apparatus having a shorter recording time, a high picture quality and a small size and a low cost is obtained for the same reason as in the first to the third embodiments. In addition, since the carrier body 34 has an elliptical shape, the size of the apparatus is further decreased, and since the platen roller 25 is located at an opening portion 34a of the carrier body 34 where the radius of curvature of the carrier body surface is maximum, and the thermal head 3 is pressed on the platen roller 25, the recording paper sheet 1 is heated at a substantially flat region of the recording paper sheet, thereby protecting the recording paper sheet from curling.

Although, in this embodiment, the platen roller is located at a position where the radius of curvature of the elliptic carrier body 34 is maximum, it may be also possible to locate the platen roller at a position where the radius of curvature is minimum. In this modification, the total height of the apparatus including the thermal head is further decreased.

Further, in this embodiment, if a film of a low friction material such as Teflon is applied over the peripheral surface of the carrier body 34, or the carrier body 34 itself is made of a low friction material, the frictional resistant force between the recording paper sheet 1 and the carrier body 34 is decreased; thereby also decreasing the load exerted on the conveying mechanism 15.

A fifth embodiment of the present invention is described below by referring to the drawings.

Figure 9:
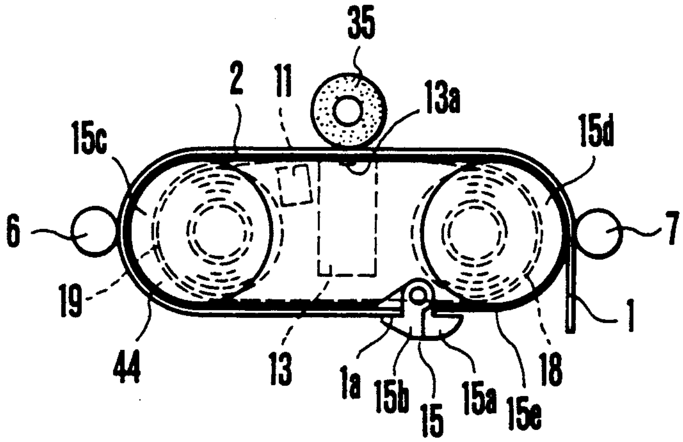
FIG. 9 is a basic illustration of a recording apparatus according to a fifth embodiment of the present invention.

FIG. 9 is a schematic view showing a basic arrangement of a recording apparatus according to the fifth embodiment. In FIG. 9 like reference numerals are attached to like elements as those shown in FIG. 8, and the detailed description is omitted for the sake of brevity. The difference from those shown in FIG. 8 is that a carrier body 44 is formed to have an oval shape; a thermal head 13, a sheet supply reel 18, a sheet take-up reel 19 and sheet sensor 11 are arranged inside of the carrier body, especially, the thermal head 13 being stationary and located at a position where its recording surface including heat generating elements 13*a* constitutes a part of the flat peripheral surface of the carrier body 44; and a platen roller 35 is located outside of the carrier body 44, and adapted to be pressed on and separated from the thermal head 13 with a recording paper sheet 1 and a ink sheet 2 being interposed therebetween.

The recording function of this fifth embodiment is similar to that of the fourth embodiment, except that the recording means including the ink sheet 2 and the thermal head 13 is located inside of the carrier body 44, and the description thereof is omitted here. Further, when the carrier body 44 passes the position of pressure contact between thermal head 13 and platen roller 35, forward end 15*a* of conveying mechanism 15 pushes up platen roller 35.

As mentioned above, in this embodiment, an apparatus having a shorter recording time, a high picture quality of a small size and a low cost without substantial curls can be also obtained for the same reason as in the first, third and fourth embodiments. In addition, since the recording means including the ink sheet 2 and the thermal head 13 is located inside of the carrier body 44, the size of the apparatus is remarkably decreased.

Although, in this embodiment, the platen roller is located at a flat portion of the oval carrier body 44, it may be also possible to locate the platen roller at a circular portion of the same. In this modification, the total height of the apparatus including the platen roller 35 is further decreased.

Further, in this embodiment, if a film of a low friction materials such as Teflon is applied over the peripheral surface of the carrying body 44, or the carrier body 44 itself is made of a low friction material, the frictional resistant force between the recording paper sheet 1 and the carrier body 44 is decreased, thereby also decreasing the load exerting to the conveying mechanism 15.

Although, in the above-mentioned fourth and fifth embodiments, the conveying mechanism 15 is driven by means of pulleys and a belt, the same effect can be obtained by using other driving means such as a linkage mechanism.

Further, although in the all embodiments except the fifth one, the thermal head 3 itself active moves to make contact with or separate from the ink sheet 2 to permit the ink sheet to move and to locate the same at a predetermined position, it may be also possible that the thermal head 3 is normally maintained in a pressure contact state, and raised and separated from the ink sheet 2 by a force from the carrier body 6 in a rotating state, when the carrier body 5 passes over the position of the thermal head 3.

Although, in the all embodiments, the recording means is described as being a thermal printing type, it may alternatively be a thermal sensitivity paper type, an electric current sensitive paper type, or the like. Further, although the colours for recording are composed of yellow, magenta and cyan in this order, the colours and the order may be different from the above, and the number of colours including single hues may be also variable. In these modifications, the above-mentioned various advantages of the present invention can be also obtained.

What is claimed is:

1. A sheet conveying device for a recording apparatus, comprising:

roller-like carrying means having an outer peripheral surface, for supporting a recording paper sheet on the outer peripheral surface thereof, said carrying means being rotatable and having an elastic surface, conveying means mounted to rotate relative to said roller-like carrying means, for conveying said recording paper sheet around said carrying means in close proximity to said outer peripheral surface of said carrying means by gripping a leading edge of the recording paper sheet, and recording means for recording an image on the recording paper sheet when making pressure contact with said carrying means with said recording paper sheet interposed between said recording means and said carrying means, said carrying means being rotatable responsive to conveyance of said recording paper sheet by said conveying means due only to a friction force between said elastic surface of said carrying means and said recording paper sheet at a position of said pressure contact between said recording means and said carrying means.

2. A sheet conveying device for a recording apparatus, comprising:

roller-like carrying means having an outer peripheral surface for supporting a recording paper sheet on the outer peripheral surface thereof, said carrying means being stationary and having an elastic surface extending over at least a part of said outer peripheral surface of the carrying means;

conveying means for conveying the recording paper sheet around said carrying means in close proximity to said outer peripheral surface of said carrying means by gripping a leading edge of said recording paper sheet, and recording means for recording an image on said recording paper sheet when making pressure contact with said carrying means with the recording paper sheet interposed between said recording means and said carrying means.

3. A device as in claim 2, wherein said outer peripheral surface of the carrying means is composed of a rigid surface an elastic surface, and said elastic surface is located opposite to said recording means.

4. A sheet conveying means for a recording apparatus, comprising:

roller-like carrying means having an outer peripheral surface, for carrying a recording paper sheet on the outer peripheral surface thereof, said carrying means being stationary and rigid, a platen roller disposed inside of said carrying means, said platen roller being rotatable and having an elastic surface, and a part of said elastic surface of the platen roller constituting a part of the surface of said carrying means, conveying means for conveying the recording paper sheet around said carrying means in close proximity to said outer peripheral surface of said carrying means by gripping a leading edge of the recording paper sheet, and recording means for recording an image on the recording paper sheet when making pressure contact with said part of the surface of the platen roller constituting a part of the surface of the said carrying means with said recording paper sheet being interposed between said recording means and said surface of the platen roller, said platen roller being rotatable, responsive to conveyance of said recording paper sheet by said conveying means due only to a friction force between said elastic surface of said platen roller and said recording paper sheet at a position of said pressure contact between said recording means and said surface of said platen roller.

5. A sheet conveying device for a recording apparatus, comprising;

carrying means having an outer peripheral surface, for carrying a recording paper sheet on the outer peripheral surface thereof, said carrying means being stationary and rigid and having a smooth peripheral contour of an oval shape such as an ellipse, a platen roller disposed inside of said carrying means, said platen roller being rotatable and having an elastic surface, and a part of said elastic surface of the platen roller constituting a part of the surface of said carrying means, conveying means for conveying the recording paper sheet around said carrying means in close proximity to said outer peripheral surface of said carrying means by gripping a leading edge of the recording paper sheet, and recording means for recording an image on said recording paper sheet when in pressure contact with said part of the elastic surface of the platen roller constituting a part of the surface of said carrying means with said recording paper sheet interposed between said recording means and said surface of said platen roller, said platen roller being rotatable responsive to conveyance of said recording paper sheet by said conveying means due only to a friction force between said elastic surface of said platen roller and said recording paper sheet at a position of said pressure contact between said recording means and said part of said elastic surface of the platen roller.

6. A device as in any one of claims 1 to 5, wherein said conveying means is so arranged that a part of said conveying means abuts against a part of said recording means and raises the recording means upwards when the rotating conveying means passes over the position of said recording means, thereby releasing the pressure contact of said recording means from said carrying means or said platen roller.

7. A sheet conveying device for a recording apparatus, comprising:

carrying means having an outer peripheral surface, for carrying a recording paper sheet on the outer peripheral surface thereof, said carrying means being stationary and rigid and having a smooth peripheral contour of an oval shape such as an ellipse, recording means having a recording surface, for recording an image on a recording paper sheet disposed inside of said carrying means, a part of the recording surface of said recording means constituting a part of the surface of said carrying means, conveying means for conveying the recording paper sheet around said carrying means in close proximity to said outer peripheral surface of said carrying means by gripping a leading edge of the recording paper sheet, and a rotatable platen roller having an elastic surface adapted to be in pressure contact with said recording surface of the recording means with said recording paper sheet being interposed between said elastic surface and said recording surface, said platen roller being rotatable responsive to conveyance of said recording paper sheet by said conveying means due only to a friction force between said elastic surface and said recording paper sheet at a position of said pressure contact between said elastic surface and said recording surface of the recording means.

8. A device as in claim 7, wherein said conveying means is so arranged that a part of said conveying means abuts against a part of said platen roller and causes the platen roller to rise upwards when the rotating conveying means passes over the position of said recording means, thereby releasing the pressure contact of said platen roller from said recording means.

9. A device as in any one of claims 1 to 8, wherein at least a part of the surface of at least either one of said carrying means and said platen roller is made of a low friction material.

* * * * *